Oct. 21, 1930.   B. BAKER   1,779,027
BERMUDA GRASS ERADICATING MACHINE
Filed Oct. 2, 1928   4 Sheets-Sheet 1
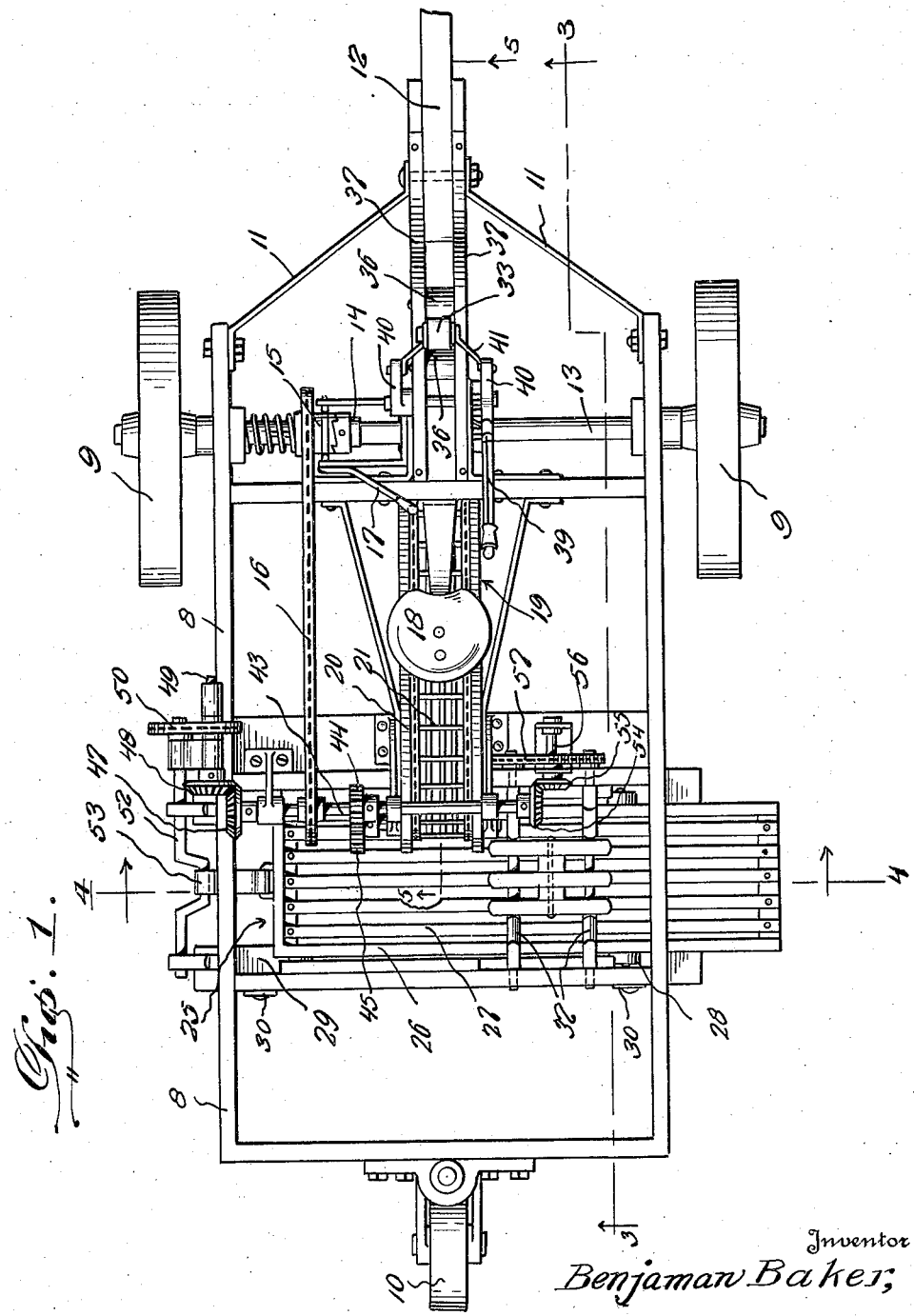
Inventor
Benjaman Baker;
By J. Stanley Burch
Attorney

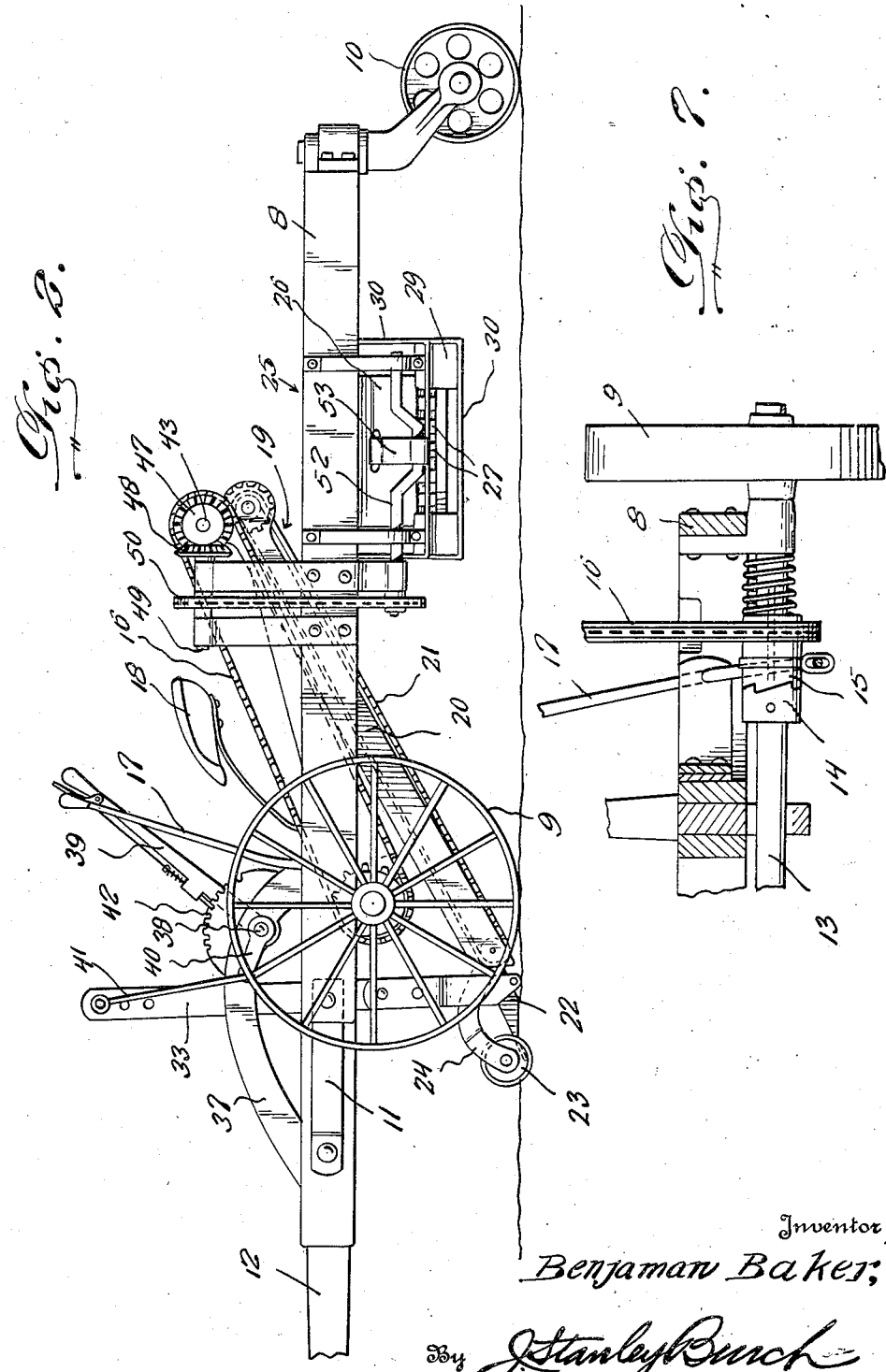

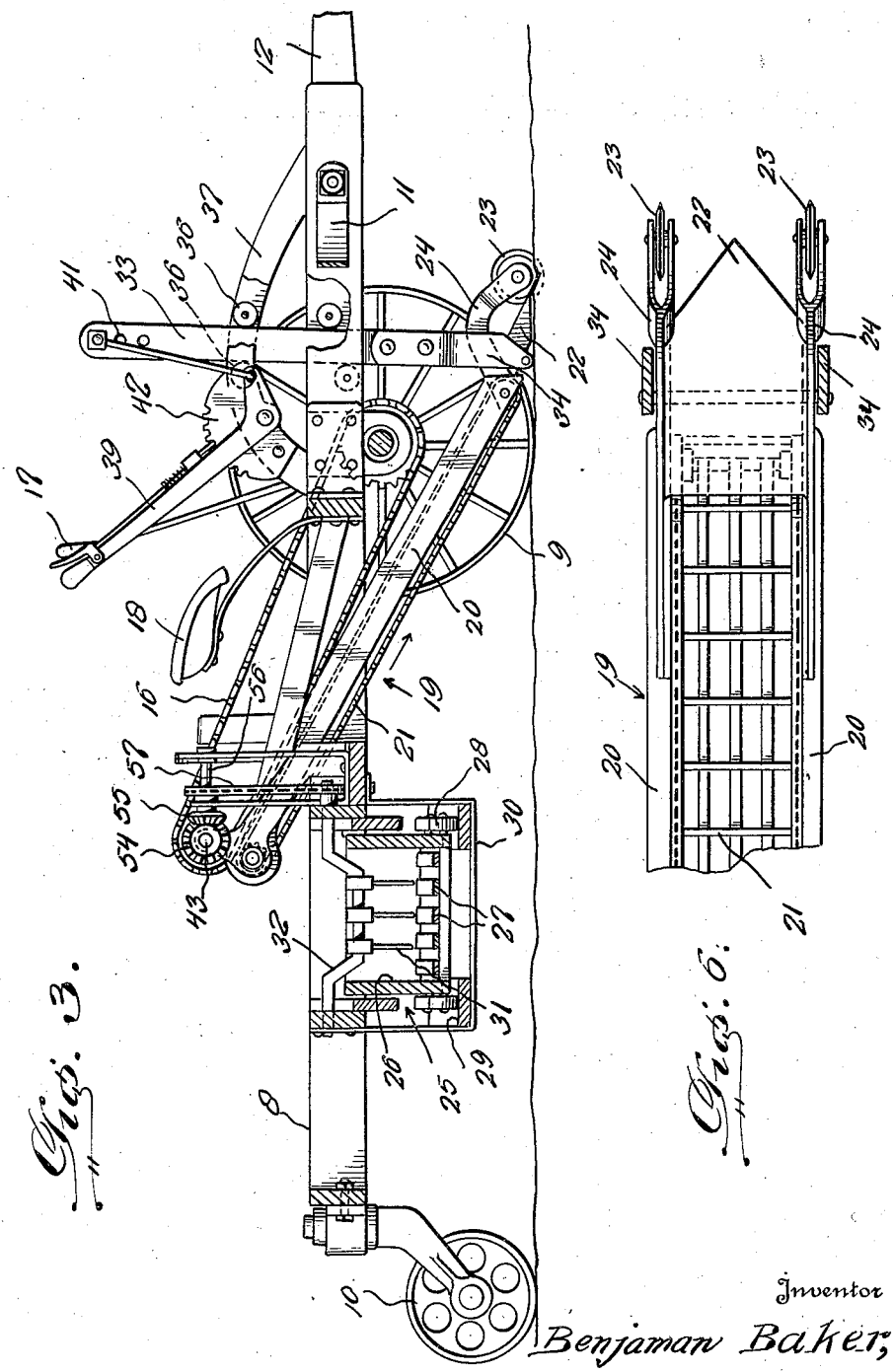

Oct. 21, 1930.  B. BAKER  1,779,027
BERMUDA GRASS ERADICATING MACHINE
Filed Oct. 2, 1928  4 Sheets-Sheet 4
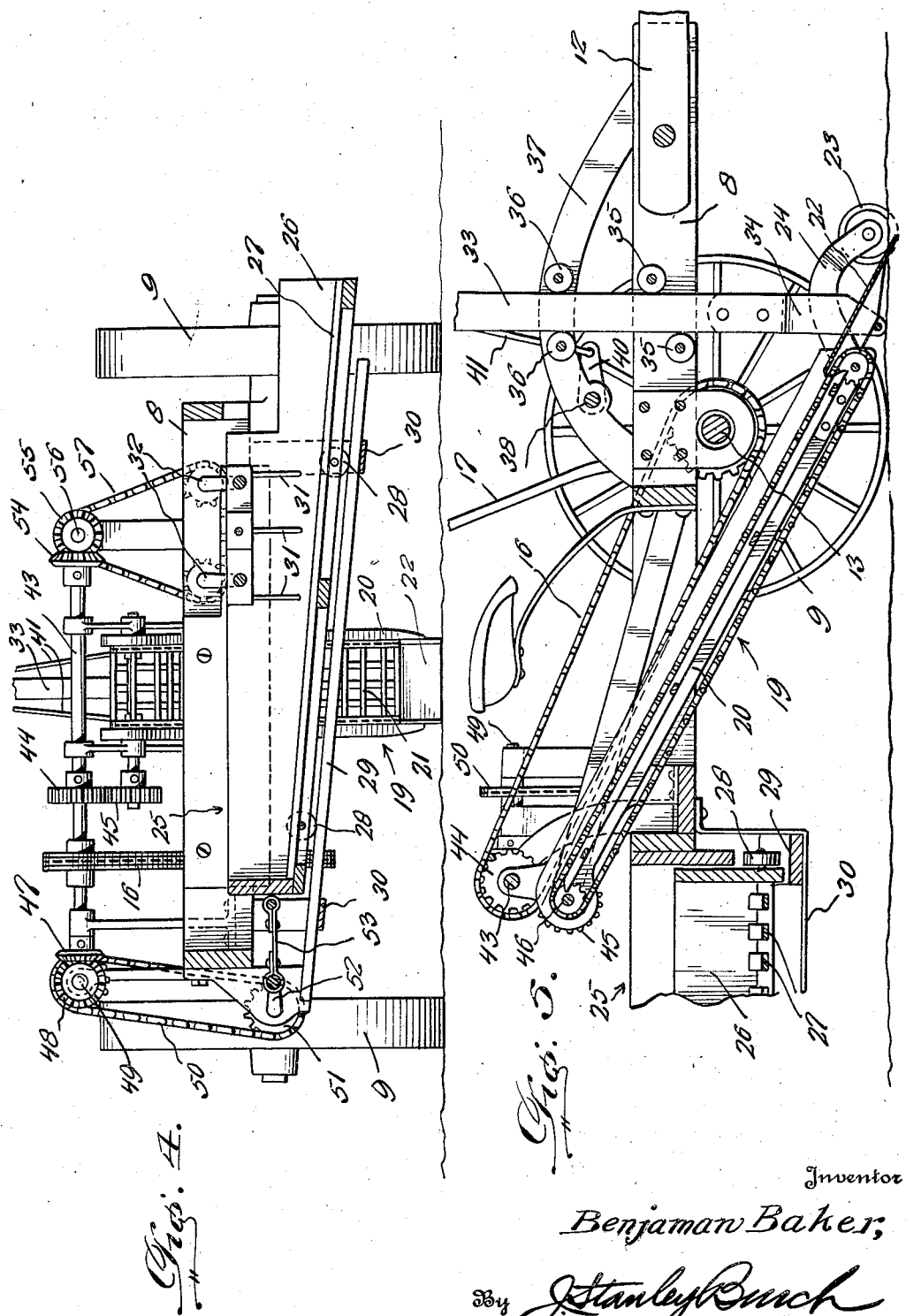
Inventor
*Benjaman Baker;*
By *J. Stanley Burch*
Attorney Patented Oct. 21, 1930

1,779,027

UNITED STATES PATENT OFFICE

BENJAMAN BAKER, OF DOUGLASS, TEXAS

BERMUDA-GRASS-ERADICATING MACHINE

Application filed October 2, 1928. Serial No. 309,770.

This invention relates to an improved farm cultivating machine of a species which may be conveniently and properly entitled a Bermuda grass eradicating machine.

The purpose of the invention is to provide a special portable machine constructed for digging or plowing up ground which has become overgrown with quack grass, Bermuda grass, weeds and the like, and subjecting the plowed ground to a special mechanical treatment, which pulverizes the ground into small pieces which is allowed to return, while separating and disposing of the grass and weeds in such a way as to permit orderly depositing in rows which may be subsequently removed with facility.

Briefly described, the machine embodies a wheel-supported frame adapted to be drawn over the surface by a suitable draft appliance. Mounted on the frame is an upwardly and rearwardly inclined elevator, whose forward end is adjustably supported and equipped with plowing and cutting means. At its upper end this elevator is disposed to discharge the ascending material into an especially designed pulverizing device in which device, the separation and agitation takes place.

One feature of the construction is the inclined elevator which includes an appropriately driven endless conveyor and a pointed plow at its forward end, which, as before intimated, is adjustable to regulate the depth of the cut and which is designed to dig the ground up in a narrow strip, there being cutting disks cooperable with this plow to aid in the severing and elevating operation.

An equally important distinction is predicated upon the transversely disposed pulverizing device which is characterized principally by a roller-supported reciprocatory shaker trough, inclined properly to promote expeditious gravitation of the separated grass and weeds, and which has associated therewith a raking and lump breaking structure to promote more efficient operation.

Other structural features and advantages of the invention will become more readily apparent from the following description and drawings.

In the drawings:

Figure 1 is a top plan of a grass eradicating machine constructed in accordance with the present invention.

Figure 2 is a side elevational view showing the operating means for the reciprocatory shaker trough.

Figure 3 is a longitudinal sectional view, portions in elevation, the section being taken approximately upon the plane of the line 3—3 of Figure 1.

Figure 4 is a transverse section taken on the plane of the line 4—4 of Figure 1.

Figure 5 is a fragmentary longitudinal sectional view taken approximately upon the plane of the line 5—5 of Figure 1.

Figure 6 is a fragmentary plan view of the intake end of the elevator; and

Figure 7 is a detailed view of the manually manipulated clutch structure.

A general idea of the complete construction will be seen in Figure 3 wherein it will be observed that 8 designates a horizontal frame having a pair of traction wheels 9 at the forward end and provided with a swiveled trailer wheel 10 at the rear. Also at the forward end we find diagonal braces 11 connected with spaced beams between which a draft tongue 12 is fastened. The front wheel axle is designated at 13 and is to be emphasized in that it is the means for supplying the power to operate the appliances which are supported on the framework. In this connection attention is invited to Figure 7 wherein it will be observed that 14 designates a stationary clutch collar and 15 a complemental toothed slidable clutch collar carrying a sprocket over which the main driving sprocket chain 16 is trained. Here we also find a thrust spring for the collar 15 and a pivotally mounted manually operable shifting lever 17 constructed at its lower end to slide the collar 15 against the action or tension of the spring. It may be conveniently added here that the lever 17 is located within convenient reach of the driver's seat 18 as shown in Figure 1.

Attention is now invited to the numeral 19 which generally designates the material elevator. This comprises a rearwardly and upwardly inclined structure including spaced side members 20 supporting an endless conveyor 21 (see Figure 6). The conveyor includes an endless drive chain which may be a sprocket chain trained over suitable sprockets. At the lower or forward end of the elevator is the digging and lifting plow 22. As shown in Figure 6 this is in the form of a pointed plate whose pointed end digs down into the ground and cuts a narrow strip. Closely associated with the plow are vertically disposed cutting disks 23 each supported on the forked end of a pair of curved supporting arms 24. These cutting disks are located adjacent the opposite longitudinal edges of the plow plate or blade. The result is that they cut slightly in advance of the plow, thus defining the width of the strip to be cut, so that the following plow blade can dig under and easily lift the earth. Then the earth feeds up and over the plow blade where it deposits on the conveyor and is allowed to ascend.

The discharge end of the elevator is located over the open top of the pulverizing device. This device is generally designated by the reference character 25. The principal part thereof is the elongated shaker trough which is in the form of a box 26 whose depth increases gradually toward the discharge end as indicated in Figure 4. The bottom of this box is made up of closely spaced slats 27 and the side walls of the box carry supporting rollers 28 which run upon inclined tracks 29. The tracks are supported through the medium of appropriate hangers 30. The discharge end of the shaker trough extends beyond the adjacent traction wheel as indicated in Figure 4 to conveniently discharge the separated grass and weeds to one side where they may be collected with facility at some subsequent time. The earth is not only subjected to the shaking action of this trough but is also treated by the lump breaking and agitating means adjacent the discharge end. This means preferably comprises a series or a plurality of depending fingers 31 terminating in close spaced proximity to the slats and supported from head structures carried by a pair of spaced parallel rotating crank shafts 32. These crank shafts are journaled on the main frame 8.

It has been before stated that the intake end of the elevator is adjustably mounted so that it may be lifted up to clear the ground or so that the depth of the cut may be regulated. This is accomplished through the use of a lifting or hoisting bar 33 (see Figures 3 and 5). This bar has a forked lower end, the arms 34 (see Figure 6) of which are connected with the plow blade. The hoisting bar is operable between pairs of rollers 35 and 36. The lower pair of rollers are supported on the frame structure and the upper pair are supported on a pair of spaced parallel arched strips 37, the latter being supported from the main frame. Also supported on one of these arched members as seen in Figure 3 is a rock shaft 38 which is operated by a lever 39. The rock shaft is provided with a pair of rocker arms 40 having link connection at 41 with the hoisting bar 33. In fact, as shown in Figure 3 the link connection is adjustable so as to vary the leverage. Then too I provide a segmental rack plate 42 and equip the lever with a pawl which is engageable with the teeth to permit the desired adjustment to be maintained. With this arrangement it is obvious that by swinging the lever in one direction the hoisting bar is lowered to allow the intake end of the elevator to be lowered to the desired place. By adjusting the bar in the opposite direction, the lower end of the elevator structure can be lifted clear of the ground for transportation from place to place on the field.

It is desirable now to consider the means for transmitting motion to the appliances. By directing attention to Figure 4 for example it will be observed that 43 designates the main drive shaft, this being journaled for rotation in appropriate bearings. Adjacent one end is a sprocket over which the aforesaid power chain 16 is trained. Thus, motion is imparted to the shaft 43 from one of the front traction wheels. There is a gear 44 on this shaft which is in mesh with a complemental gear 45 carried by a shorter shaft 46 which carries the traction chains for the aforesaid endless conveyor as shown in Figure 5. The result is that the elevator is operated from shaft 43 through the medium of these intermeshing gears. At one end of the shaft is a beveled gear 47 meshing with a complemental beveled gear 48 on a right angularly disposed stub shaft 49. Then as shown in Figure 1 this stub shaft is equipped with a sprocket wheel having a complemental sprocket chain 50 which leads down to and is trained over a sprocket wheel 51 on the crank shaft 52 (see Figure 4). This crank shaft is journaled in appropriate bearings and a suitable connecting strip 53 is connected therewith and with the adjacent end of the reciprocatory shaker trough 25. Also as shown in Figure 4 on the opposite end of the shaft 43 are beveled gears 54 and 55, the last named of which is on a short shaft 56 which drives the triangularly shaped sprocket chain 57. The sprocket chain 57 in turn drives the aforesaid crank shafts 32 through the medium of appropriate sprocket wheel connection. It follows therefore that the power which is derived from one of the traction wheels is transmitted through the clutch structure to the main driving sprocket chain 16 which as before stated operates the main drive shaft 43. Then through the several power take-off devices consisting of the gearing and the sprocket chain structure, this power is transmitted simultaneously to the elevator, the shaker trough and the agitating finger structure.

In operation it is understood that the draft tongue is connected with a suitable lead vehicle such as a tractor or other farm implement. Then as it is drawn over the surface, a narrow strip of ground is cut through the medium of the cutting disk 23 and the complemental plow blade 22. The loosened material travels up and onto the endless conveyor, where it is elevated and discharged into the pulverizing device 25. Here the material is acted upon by the longitudinal reciprocating shaking action of the trough. The ground which is disintegrated is literally sifted between the slats, while the grass and weeds are separated from the lumps of dirt. The grass and weeds gravitate along the slats through the open discharge end of the trough where they are piled in rows along side of the machine as it travels across the field. It is also obvious that the breaking and agitating fingers on the crank shafts adjacent the discharge end also come into play in breaking up obstinate lumps of dirt. The result is that the material is subjected to the desired separating and eradicating action.

It is thought that the foregoing description and drawings characterize the mechanical achievement in the art which is practicable in construction, economical in use, positive and dependable in performance and capable of fulfilling the requirements of an invention of this class in an efficient manner. It is thought however that the advantages and features will be clearly understood by those skilled in the art to which the invention relates. Therefore, a more lengthy description is regarded as unnecessary.

Minor changes in shape, size and rearrangement of parts coming within the field of invention claimed may be resorted to in actual practice if desired.

I claim:

1. In a grass and weed eradicating machine of the class described, a portable support, a material elevator on said support, material cutting and delivering means at the intake end of the elevator, and a material pulverizing and separating device at the discharge end of the elevator, said device comprising a pair of spaced parallel inclined tracks, together with a trough open at its discharge end, having an open bottom, and provided with supporting rollers movable along said track.

2. In a grass and weed eradicating machine of the class described, a portable support, a material elevator on said support, material cutting and delivering means at the intake end of the elevator, and a material pulverizing and separating device at the discharge end of the elevator, said device comprising a pair of spaced parallel inclined tracks, together with a trough open at its discharge end, having an open bottom, and provided with supporting rollers movable along said track, means for reciprocating said trough to impart a shaking motion thereto, and agitating means adjacent the discharge end of said trough and comprising a pair of spaced parallel crank shafts, agitating fingers depending into the trough, and means connecting said fingers with said crank shafts.

3. In a grass and weed eradicating machine of the class described, a horizontal supporting frame, an axle journaled in bearings at the forward end of the frame, traction wheels carried by said axle, a single swiveled trailer wheel at the rear end of said frame, an upwardly and rearwardly inclined material elevator supported on said frame, a plow blade at the forward intake end of the elevator, cutting disks associated with said plow blade, and lowering means for the forward end of the elevator, a transversely disposed pulverizing device at the discharge end of said elevator and embodying a track and roller supported downwardly and outwardly inclined material receiving trough, a crank shaft at one end of said trough, an operating connection between the crank shaft and trough, a pair of supplemental spaced parallel crank shafts on the main frame adjacent the discharge end of the trough, agitating fingers mounted on said last named crank shaft, a drive shaft mounted on the frame structure, operating connection between the drive shaft and axle, and individual operating connection between the end portion of said drive shaft and said crank shafts, together with a separate driving connection between the intermediate portion of the drive shaft and the elevator.

In testimony whereof I affix my signature.

BENJAMAN BAKER.